United States Patent [19]

Heighington et al.

[11] Patent Number: 5,543,207

[45] Date of Patent: Aug. 6, 1996

[54] WALL COVERINGS

[75] Inventors: John E. Heighington, Halifax; Daphne Butters, Sheffield; Stephen J. Claxton, Harlow, all of United Kingdom

[73] Assignee: Synthomer Limited, United Kingdom

[21] Appl. No.: 342,206

[22] Filed: Nov. 18, 1994

Related U.S. Application Data

[63] Continuation of Ser. No. 188,038, Jan. 26, 1994, abandoned.

[51] Int. Cl.$^6$ .............................. B32B 5/16; B32B 23/08
[52] U.S. Cl. ..................... 428/207; 428/206; 428/323; 428/330; 428/331; 428/305.5; 428/514; 428/904.4; 524/425
[58] Field of Search ................................ 428/904.4, 330, 428/331, 514, 206, 207, 323

[56] References Cited

U.S. PATENT DOCUMENTS 1,764,408  6/1930  Janeway .
4,853,276  8/1989  Kurushima ........................ 428/904.4

FOREIGN PATENT DOCUMENTS

| 1147116 | 5/1983 | Canada ........................ 428/904.4 |
| 0492087 | 7/1992 | European Pat. Off. . |
| 0543793 | 5/1993 | European Pat. Off. . |
| 1348437 | 10/1987 | U.S.S.R. . |
| 1654405 | 6/1991 | U.S.S.R. . |
| 430284 | 6/1935 | United Kingdom . |
| 2201613 | 9/1988 | United Kingdom . |

*Primary Examiner*—P. C. Sluby
*Attorney, Agent, or Firm*—Bromberg & Sunstein

[57] ABSTRACT

A composition for coating onto a substrate to form a wall covering comprises an aqueous latex of a copolymer of a diene and a copolymerisable ester such as methacrylate. The composition may include a filler and/or pigment and may include a blowing agent.

9 Claims, No Drawings

WALL COVERINGS

This application is a continuation of application Ser. No. 08/188,038, filed Jan. 26, 1994, now abandoned, the entire disclosure of which is incorporated herein by reference.

This invention relates to wall coverings and is concerned with a coating composition for coating onto a substrate in the production of wall coverings.

It is known to produce wallpaper and like materials by coating a substrate with a synthetic latex composition based on, for example, acrylic materials or ethylene/vinyl acetate copolymers usually in combination with a filler in an amount of from, for example, 500 to 900 parts by weight of dry copolymer. Such compositions have good UV resistance, good printability and a degree of sponge resistance, but they will not withstand scrubbing and they have little dry abrasion resistance. The coating cannot normally be peeled as a sheet from the substrate (which is a disadvantage when ultimately stripping the wall covering from the wall) and the coated substrate has poor resistance to wear and soiling by, for example, household products such as ketchup and mustard. Generally, the compositions are applied in an amount of from 15 to 25 $g/m^2$ or up to 40 $g/m^2$ if an improved degree of spongeability is required or if the surface is to be embossed.

To some extent, the aforementioned disadvantages can be overcome by using coating compositions comprising a plastisol which is a colloidal dispersion of vinyl chloride polymer in a plasticiser. The vinyl plastisol is applied to a substrate of paper or the like to form a coating and the coating is then subjected to elevated temperature to gel it. The composition may be applied as a uniform coating or in patterned form and may include a filler and/or pigment. In the case where a structured coating is to be produced, a blowing agent is included in the composition to cause the composition to expand as the coating is gelled.

These plastisol-based coatings offer much improved scrub resistance and are more durable than conventional latex-based coatings. Also PVC plastisol-based coatings can be peeled as a sheet from the backing paper on stripping and they have improved hanging properties due to improved wet tear resistance. Further, the plastisol-coated coating materials have improved dimensional stability and good stain and soil resistance. However, PVC plastisol coatings are not light or heat stable, and suffer colour degradation. Also PVC plastisols can be difficult to process in that a controlled and uniform surface gloss is difficult to maintain. Further, the high temperatures required in the processing of PVC plastisols require specialised high temperature equipment and the spirit solvents, normally found necessary to the processability of PVC plastisols, need to be extracted and disposed of by regulated methods. In addition, the accidental burning of PVC plastisol coated paper or its incineration during disposal produces various toxic products of combustion.

The rheological behaviour of PVC plastisols prevents the incorporation of high levels of filler under typical coating conditions for wallpaper production and thus the filler content is usually limited to from about 20 to about 90 parts by weight per 100 parts by weight of dry vinyl chloride polymer. Also the rheological behaviour of the plastisol can become undesirable after excessive periods of standing or when subjected to moderately elevated temperatures. Further, the adhesion of aqueous based ink to PVC coatings can be unsatisfactory due to the hydrophobic character of the PVC surface.

Water based coatings are considered to be more environmentally acceptable than coatings based on vinyl plastisols and it is an object of the present invention to overcome the environmental and other disadvantages of PVC plastisols by replacing the plastisol with a coating composition which is based on an aqueous medium and which has a reduced content of, or is free of, chlorine. This object is achieved by using a coating composition based on a butadiene/copolymerisable ester copolymer latex.

USSR Inventors Certificate No. 1348437 discloses a wallpaper having improved wet strength, wet abrasion resistance, and performance. This is achieved by means of a surface layer formed of a composition comprising a butadiene/methyl methacrylate copolymer in admixture with a butadiene/styrene copolymer. There is no suggestion to include a pigment or filler or blowing agent in the composition. Moreover the composition is applied to a primed and printed substrate not directly to the substrate. During application of the composition, the butadiene/styrene copolymer tends to rise to the surface so that the butadiene/methyl methacrylate copolymer serves as an interlayer between the primed and printed substrate and the butadiene/styrene copolymer which constitutes the free surface of the wallpaper.

USSR Inventors Certificate No. 1654405 discloses a wallpaper having improved stability to fight, decorative properties, and moisture resistance. This is achieved by means of an aqueous coating composition comprising a water dispersible binder, metal oxide-coated mica as decorative pigment, an ethylene oxide/propylene oxide polymer, and a thickening agent. The binder may be inter alia a butadiene/methyl methacrylate copolymer latex. There is no suggestion to include a filler in the composition. Moreover, the composition is applied to a precoated paper substrate as a decorative lacquer which is not overprinted.

According to one aspect of the present invention there is provided a composition suitable for coating onto a substrate in wall covering production which composition comprises:

(i) a copolymer of a diene and a copolymerisable ester, (ii) a filler, and (iii) a pigment, in an aqueous medium.

According to another aspect of the present invention there is provided a wall covering comprising a substrate coated directly with a composition comprising a filler and/or pigment and a copolymer of a diene and a copolymerisable ester.

According to a further aspect of the present invention there is provided a wall covering comprising a substrate coated directly with a composition which is free of filler and pigment and which comprises a copolymer of a diene and a copolymerisable ester.

The diene may be a conjugated diene such as butadiene or isoprene and the copolymerisable ester may be any suitable unsaturated ester and is preferably an ester of (meth) acrylic acid such as methyl methacrylate, ethyl methacrylate, butyl methacrylate, methyl acrylate, ethyl acrylate, propyl acrylate, butyl acrylate or hexyl acrylate. Generally, the copolymer will include from about 10 to about 70 parts by weight of the diene and from about 90 to about 30 parts by weight of the ester. It is particularly preferred for the copolymer to include from about 20 to 50 parts by weight of the diene and from about 80 to 50 parts by weight of the ester. Small amounts (e.g. up to about 15 to 20 parts by weight of the copolymer) of units derived from other monomers such as (meth)acrylic acid, itaconic acid, hydroxyethyl acrylate, acrylamide, divinyl benzene, and ethylene glycol dimethacrylate, may be present in the copolymer.

The copolymer is ordinarily incorporated in the composition in the form of an aqueous latex with which the filler, pigment and blowing agent, if present, are admixed and the latex preferably has a total solids content of not more than about 85% by weight and typically from about 25 to 75% by weight.

The free surface of the wall covering is constituted by the diene/ester copolymer in combination with the filler and/or pigment when present.

The filler, when present, can be any conventional filler but it is particularly preferred to use calcium carbonate, calcium magnesium carbonate, or clay. Typically, the filler is present in an amount of from about 5 to about 350 parts by weight per 100 parts of dry copolymer.

The pigment, when present, can be any conventional opacifying or colouring pigment and typically is present in an amount of from about 1 to 30 parts by weight per 100 parts by weight of dry copolymer. Titanium dioxide is the preferred pigment and can be used in amounts generally less than those needed for vinyl plastisols because of the intrinsic low colour of the copolymer and because the copolymer has a low tendency to discolour upon heating or irradiation with light. However, any conventional opacifying or colouring pigment such as zinc oxide and carbon black can be used.

In the case where the coating composition is to be foamed so as to form a textured coating, a blowing agent may be included or the system may be mechanically foamed. Any suitable conventional blowing agent may be used but it is particularly preferred to use blowing agents of the type consisting of a plurality of capsules comprising a polymeric shell encasing a hydrocarbon. Commercially available examples of such a blowing agent are the materials known as Mikroperlen (available from Lehmann & Voss in Germany) and Expancel (from Nobel Industries in Sweden) which comprise microspheres formed of vinylidene chloride or acrylonitrile polymer encapsulating a low boiling point paraffin. At slightly elevated temperature, the microsphere shell softens and allows the microspheres to expand so that the coating adopts a foamed structure. Generally, the blowing agent may be present in the composition in an amount of up to about 6% active of the dry total composition weight.

The rheology of the composition for coating purposes can be adjusted by thinning with water or by the incorporation of a thickener, as desired. Any conventional thickener for this purpose may be used, such as sodium or ammonium polyacrylate, hydroxy ethyl cellulose, poly vinyl pyrrolidone, poly vinyl alcohol, or poly acrylamide. Generally, the viscosity of the composition at the time of coating should be of the order of from 500 to 20000 mPa.s.

The composition may include other ingredients such as, for example, a defoaming agent to prevent the composition undergoing unintentional air entrainment during processing. Dispersing and/or wetting agents may be included to facilitate the incorporation of pigment or filler and to help stabilise the final composition viscosity. Also, biocides and antioxidants may be incorporated to improve service life.

In use of the composition in wallpaper production, it is applied to the surface of a web of wall paper base paper in conventional manner by, for example, a knife coater or, in the case where a patterned coating is to be produced, by means of a rotary screen. Typical coating weights are from 20 to 800 g/m$^2$ preferably from 80 to 250 g/m$^2$. The coated web is then subjected to elevated temperature to dry the composition. Ordinarily, a temperature of from about 110° to 170° C. and a drying time of from about 15 seconds to 2 minutes, usually from about 45 to 60 seconds, is sufficient to dry and expand (as appropriate) the coating composition of the invention. Thereafter, the free surface of the dried coating will ordinarily be printed with an appropriate design as desired.

The compositions of the present invention have the advantage that they have excellent colour retention when subjected to light or heat. They possess an inherent high degree of surface mattness and, importantly, a controllable gloss level on high temperature processing. Also they have good viscosity and rheological stability and high compatibility with aqueous inks. The compositions are economic to produce because of their high tolerance to filler addition and because lower processing temperatures can be used than for PVC. Moreover, the compositions are such that equipment contaminated with them during their preparation and use can be easily washed with water and the compositions themselves can be readily disposed of, when necessary, in an environmentally acceptable manner.

The following Examples illustrate the invention.

EXAMPLE 1

A 50% aqueous latex formed from a butadiene/methyl methacrylate copolymer containing 39 parts by weight butadiene, 59 parts by weight of methyl methacrylate and 2 parts by weight of acrylic acid, was admixed with 1.0 part by weight (wet) of an anti-foaming agent and with 100 parts by weight of calcium magnesium carbonate filler (40 parts of which was first pre-mixed with 10 parts by weight by TiO$_2$ pigment in 15 parts by weight of water and 0.2 parts by weight of a dispersing aid) per 100 parts of dry copolymer. The antifoaming agent was Foamaster DF 124L of Henkel-Nopco Ltd, Leeds, United Kingdom, the dispersing aid was a sodium polyphosphate glass known as 20% Calgon PT of Albright & Wilson Limited, Whitehaven, United Kingdom and the filler was Microdol H-400 of Norwegian Talc (U.K.) Ltd, Liverpool, United Kingdom. Sodium polyacrylate thickener (1 part by weight per 100 parts dry copolymer) was added so that the viscosity of the composition was 3500 mPa.s., Brookfield RVT, Spindle 6/100 rpm.

The composition was used in wallpaper production by being applied to an un-primed paper web using a roller and doctor knife, the coated web then being passed through a drying oven at a temperature of 130° C. for 1 minute to dry the coating. The coating had a flat durable surface which could readily be printed with aqueous inks.

EXAMPLE 2

A 50% aqueous latex based on a butadiene/methyl methacrylate copolymer comprising 29 parts by weight of butadiene and 69 parts by weight of methyl methacrylate and 2 parts by weight of acrylic acid was admixed with 1.0 part by weight (wet) of an anti-foaming agent, with 100 parts by weight of calcium magnesium carbonate filler (40 parts of which was first pre-mixed with 10 parts by weight of TiO$_2$ pigment in 15 parts by weight water and 0.2 parts by weight of a dispersing aid) and with 10 parts by weight of Mikroperlen F20 blowing agent per 100 parts by weight of dry copolymer. The anti-foaming agent was Surfynol DF-110L of Air Products and Chemicals, Inc., U.S.A., the dispersing aid was 20% Calgon PT, and the filler was Microdol H-400. 1.5 parts by weight of sodium polyacrylate thickener per 100 parts by weight of dry copolymer were added so that the viscosity of the composition was 10000 mPa.s., Brookfield RVT, spindle 6/100 rpm.

The composition was then used in wall paper production by being applied to an un-primed paper web to form a pattern on the paper web using a rotary. screen. The thus coated web was then passed through an oven heated to 150° C. The residence time in the oven was about 60 seconds. This treatment activated the blowing agent causing the coating to expand and adopt a foamed structure as it dried. In this way, wallpaper having a durable textured pattern thereon was obtained.

EXAMPLE 3

A 51% aqueous latex formed from a butadiene/methyl methacrylate copolymer containing 35 parts by weight of butadiene, 62 parts by weight of methylmethacrylate, 2 parts by weight of acrylic acid, and 1 part by weight of iraconic acid was admixed with 10 parts by weight of titanium dioxide, 100 parts by weight of calcium magnesium carbonate and additives to aid dispersion and prevent foaming. The dispersion aid was 0.2 parts by weight of 20% Calgon PT per 100 parts by weight of dry copolymer and the anti-foaming agent was 1.0 part by weight (wet) of Foamaster-NXZ (of Henkel Nopco Ltd) per 100 parts by weight of dry copolymer. The filler was a mixture of Microdol H-400 and Microdol Extra of Norwegian Talc (UK) Ltd. The mixture was thickened to 700 mPa.s, Brookfield RVT, spindle 6/100 rpm, by the addition of 0.6 parts by weight per 100 parts of dry copolymer of sodium polyacrylate. A 110 g/m$^2$ coating of this composition was applied to 90 g/m$^2$ wallpaper base paper by using a Werner Mathis knife over roller. The coating was dried at 150° C. for 60 seconds.

A 110 g/m$^2$ coating of PVC plastisol (formulated for use as a wallpaper coating) was applied to 90 g/m$^2$ wallpaper base paper by using a Werner Mathis knife over roller. The coating was pre-gelled at 120° C. for 120 seconds and fully gelled at 185° C. for 12 seconds.

Samples of the two coated sheets were subjected to the following dwell times at 230° C.:

- 0 seconds
- 15 seconds
- 30 seconds
- 45 seconds
- 60 seconds

The samples were examined for colour changes. No colour change at any dwell time was apparent in the butadiene/methyl methacrylate coating although the wallpaper base paper began to exhibit a colour change at 45 seconds, and this became very noticeable at 60 seconds. The PVC coating showed some colour change in the form of dark spots at 45 seconds. After 60 seconds the colour had changed from white to brown with black spots evident. This was due to decomposition of the PVC. Thus, the butadiene/methyl methacrylate based material exhibited superior colour retention at elevated temperature.

EXAMPLE 4

A 52% aqueous latex formed from a butadiene/ methylmethacrylate copolymer containing 40 parts by weight of butadiene, 57 parts by weight of methyl methacrylate, 2 parts by weight of acrylic acid, and 1 part by weight of iraconic acid was admixed with 10 parts by weight of titanium dioxide, 100 parts by weight of calcium magnesium carbonate and additives to aid dispersion and prevent foaming. The dispersion aid was 0.2 parts by weight of 20% Calgon PT per 100 parts by weight of dry copolymer, the anti-foaming agent was 1.0 part by weight of Surfynol DF 110L per 100 parts by weight of dry copolymer, and the calcium magnesium carbonate filler was Microdol Extra. The mixture was thickened to 4700 mPa.s, Brookfield RVT, spindle 7/100 rpm, by the addition of 0.5 parts by weight (wet) of Acrysol RM825 (of Rohm and Haas Company, Philadelphia, U.S.A.) per 100 parts by weight of dry copolymer.

A 110 g/m$^2$ coating of this composition was applied to 90 g/m$^2$ wallpaper base paper using a Werner Mathis knife over roller and dried at 150° C. for 60 seconds.

A 110 g/m$^2$ coating of PVC plastisol (formulated for use as a wallpaper coating) was applied to 90 g/m$^2$ wallpaper base paper using a Werner Mathis knife over roller. After pre-gelling for 120 seconds at 120° C., the coating was fully gelled at 185° C. for 12 seconds.

Samples of the two coated sheets were subjected to artificial light (using a Xenotester 150 which simulates natural conditions i.e. night, day, radiation etc.) and compared to samples which had been kept in a darkened environment (control). The PVC samples exhibited severe yellowing, whereas the butadiene/methyl methacrylate product retained a much higher level of whiteness and exhibited very little colour change;

EXAMPLE 5

A 49% aqueous latex formed from a butadiene/methylmethacrylate copolymer containing 28 parts by weight of butadiene, 70 parts by weight of methyl methacrylate, and 2 parts by weight of itaconic acid was admixed with 10 parts by weight of titanium dioxide, 100 parts by weight of calcium magnesium carbonate and 7 parts by weight of a blowing agent and additives to aid dispersion and prevent foaming. The blowing agent was Expancel 461, the dispersion aid was 0.2 parts by weight of 20% Calgon PT per 100 parts by weight of dry copolymer, the anti-foaming agent was 1 part by weight (wet) of Foamaster DF 124L per 100 parts by weight of the dry copolymer, and the calcium magnesium carbonate filler was Microdol Super of Norwegian Talc (UK) Ltd. The mixture was thickened to 9300 mPa.s, Brookfield RVT, spindle 7/100 rpm, by the addition of 1.0 part by weight (wet) of Acrysol RM 825 per 100 parts by weight of the dry copolymer.

A 200 g/m$^2$ coating of this composition was applied to 120 g/m$^2$ wallpaper base paper by the Knife over roller technique. The coating was dried and expanded at 160° C. for 75 seconds to give a foamed product.

As a comparison, a 200 g/m$^2$ coating of an expansible PVC plastisol ("Blown Vinyl") was applied to a similar base paper. The coating was gelled and expanded at 210° C. for 45 seconds to form a foamed product.

Samples of each product were subjected to artificial light in the manner of Example 4. The PVC sample exhibited some yellowing whereas the butadiene/methylmethacrylate product retained a much higher level of whiteness.

EXAMPLE 6

A 53% aqueous latex formed from a butadiene/methylmethacrylate copolymer containing 62 parts by weight of methyl methacrylate, 35 parts by weight of butadiene, 2 parts by weight of acrylic acid, and 1 part by weight of itaconic acid was admixed with 10 parts by weight of titanium dioxide, 100 parts by weight of calcium carbonate filler (Polycarb 60 of ECC International, St. Austell, United Kingdom), a dispersing aid and a de-foamer. The dispersing aid was 0.2 parts by weight of 20% Calgon PT per 100 parts by weight of dry polymer and the de-foamer was 1 part by weight (wet) of Foamaster NXZ per 100 parts by weight of the dry copolymer. The mixture was thickened to 1000 mPa.s, Brookfield RVT, Spindle 6/100 rpm using, as thickener, 0.7 parts by weight of sodium polyacrylate per 100 parts by weight of dry copolymer.

A 110 g/m$^2$ coating of this composition was applied to 90 g/m$^2$ wallpaper base paper using the knife over roller technique and dried at 150° C. for 60 seconds to obtain product 1. 110 g/m$^2$ of a standard PVC plastisol, formulated specifically for wallpaper manufacture, was also applied to 90 g/m$^2$ wallpaper base paper. This was pre-gelled for 120 seconds at 120° C. and fully gelled for 12 seconds at 185° C. to obtain product 2.

Samples were then cut longitudinally from each product. One half of each sample was used as a reference and the other half was subjected to extra temperature and dwell time. Gloss readings were taken from each half using a 75' head Rhopoint Glossmeter. A total of six readings was taken and the highest, lowest and average readings were noted.

| SAMPLE HEAT TREATMENT | GLOSS % HIGH BEFORE/AFTER TREATMENT | GLOSS % LOW BEFORE/AFTER TREATMENT | GLOSS AVERAGE BEFORE/AFTER TREATMENT |
|---|---|---|---|
| Product 1 30" @ 125° C. | 23.6/22.5 | 21.5/21.5 | 22.0/22.5 |
| Product 2 30" @ 125° C. | 26.7/43.0 | 25.2/40.5 | 25.8/41.8 |
| Product 1 30" @ 150° C. | 22.9/22.3 | 21.6/20.6 | 22.2/21.5 |
| Product 2 30" @ 150° C. | 26.7/46.1 | 25.3/44.8 | 25.8/45.6 |
| Product 1 30" @ 175° C. | 22.4/21.9 | 20.6/21.1 | 22.0/21.4 |
| Product 2 30" @ 175° C. | 27.5/49.7 | 25.3/46.7 | 26.0/47.9 |
| Product 1 30" @ 200° C. | 23.2/22.6 | 21.9/20.9 | 22.5/21.7 |
| Product 2 30" @ 200° C. | 27.4/63.5 | 26.2/60.0 | 26.7/61.5 |
| Product 1 30" @ 225° C. | 22.7/23.0 | 21.5/21.4 | 22.2/22.2 |
| Product 2 30" @ 225° C. | 26.3/62.6 | 24.6/56.3 | 25.6/59.9 |

Colour changes were seen in product 2 (the PVC-based product) at 200 and 225° C. Product 1 retained its gloss level even at elevated temperatures. However, product 2 showed increases in gloss level at all temperatures. Gloss increase can effect the end product. This is particularly noticeable at the edges where the material is normally the hottest because the edges are closest to the oven walls. This can lead to edge to edge problems, and can result in a glossy line being apparent where two edges are adjacent to one another when hung on a wall.

EXAMPLE 7

A 50% aqueous latex formed from a butadiene/methylmethacrylate copolymer containing 59 parts by weight of methyl methacrylate, 39 parts by weight of butadiene, and 2 parts by weight of acrylic acid was admixed with 10 parts by weight of titanium dioxide, 100 parts by weight of calcium magnesium carbonate (Microdol H-400) and additives to aid dispersion and prevent foaming. The dispersion aid was 0.2 parts by weight of 20% Calgon PT per 100 parts by weight of dry copolymer and the anti-foaming agent was 0.8 parts by weight of a mixture of hydrophobic components in paraffin based mineral oil known as BYC 033 (of Rhone-Poulenc Chemicals, Manchester, United Kingdom) per 100 parts by weight of the dry copolymer. The mixture was thickened to 1000 mPa.s, Brookfield RVT, Spindle 7/100 rpm by the addition of 0.7 parts by weight of sodium polyacrylate per 100 parts by weight of dry copolymer to give product 1.

A 52% aqueous latex formed from a butadiene/methyl methacrylate copolymer containing 30 parts by weight of butadiene, 67 parts by weight of methyl methacrylate, 2 parts by weight of acrylic acid and 1 part by weight of itaconic acid, was admixed with 10 parts by weight titanium dioxide, 100 parts by weight of calcium magnesium carbonate (Microdol H-400), 7 parts by weight of Expancel 551 blowing agent per 100 parts by weight of dry copolymer and additives to aid dispersion and prevent foaming. The antifoaming agent was 0.5 parts by weight of silica dispersed in oil known as Hercules 1512M (Of Hercules Ltd, Salford, United Kingdom) per 100 parts by weight of the dry copolymer and the dispersion aid was 0.2 parts by weight of 20% Calgon PT per 100 parts by weight of dry copolymer. The mixture was thickened to 4200 mPa.s, Brookfield RVT, spindle 7/100 rpm by the addition of 1.3 parts by weight of sodium polyacrylate per 100 parts by weight of dry copolymer to give product 2.

Viscosity readings of samples of both mixtures were determined using a Brookfield RVT viscosity, spindle 7 and various speeds. The samples were then stored at approximately 10° C. for eight months, and then viscosity readings were taken a second time. The samples were also examined for signs of pigment/filler settlement.

| | PRODUCT 1 | | | | | | |
|---|---|---|---|---|---|---|---|
| SPEED(RPM) | 1 | 2.5 | 5 | 10 | 20 | 50 | 100 |
| READING (mPa · S) | | | | | | | |
| SAMPLE: | | | | | | | |
| Fresh | 27800 | 14300 | 8000 | 5500 | 3500 | 1800 | 1000 |
| 8 Months | 30200 | 15500 | 9500 | 6000 | 3800 | 2100 | 1400 |

| | PRODUCT 2 | | | | | | |
|---|---|---|---|---|---|---|---|
| SPEED(RPM) | 1 | 2.5 | 5 | 10 | 20 | 50 | 100 |
| READING (mPa · S) | | | | | | | |
| SAMPLE: | | | | | | | |
| Fresh | 96000 | 53500 | 33100 | 21000 | 12900 | 6800 | 4200 |
| 8 Months | 103100 | 56100 | 35300 | 22000 | 13600 | 7200 | 4700 |

The products exhibited very little viscosity increase after eight months and thus no significant theological changes had occurred. Both were capable of being used without requiring viscosity adjustment prior to application. No signs of settlement were found in either case.

EXAMPLE 8

A 51% aqueous latex of butadiene/methylmethacrylate copolymer containing 35 parts by weight of butadiene, 62 parts by weight of methyl methacrylate, 2 parts by weight of acrylic acid and 1 part by weight of itaconic acid was admixed with 15 parts by weight of titanium dioxide, 150 parts by weight of calcium carbonate (Durcal 5 of Croxton & Garry Ltd, Dorking, United Kingdom) and additives to aid dispersion and prevent foaming. The dispersion aid was 0.2 parts by weight of 208 Calgon PT per 100 parts by weight of dry copolymer and the anti-foaming agent was 1.0 part by weight (wet) of Foamaster DF124L per 100 parts by weight of the dry copolymer. The mixture was thickened to 700 mPa.s, Brookfield RVT, Spindle 6/100 rpm by the addition of 0.3 parts by weight of Acrysol RM825 per 100 parts by weight of wet composition.

A 110 g/m$^2$ coating of this composition was applied to 90 g/m$^2$ wallpaper base papers by using a Werner Mathis knife over roller. The coated papers were dried at various temperatures and dwell times to determine the lowest temperature and dwell time needed. The temperature(°C.) and dwell times (seconds) used and the result obtained in each case are shown below:

a) 140/60" dried to a smooth film
b) 130/60" dried to a smooth film
c) 120/60" dried to a smooth film
d) 120/30" dried to a smooth film
e) 110/60" dried to a smooth film
f) 110/45" dried to a smooth film
g) 110/30" definite slight tackiness, not fully dry
h) 100/60" very slight tackiness, not fully dry
j) 100/45" definite slight tackiness, not fully dry
k) 100/30" definite slight tackiness, not fully dry It can be seen, from the foregoing, that the composition can be dried at a temperature of 110° C. using a dwell time of 45 seconds. (This temperature is some 70° C. less than the temperature normally required to gel PVC plastisol.) If shorter drying times are required, then these can be achieved by increasing the temperature to compensate.

EXAMPLE 9

A 51% aqueous latex of a butadiene/methylmethacrylate copolymer containing 62 parts by weight of methylmethacrylate, 35 parts by weight of butadiene, 2 parts by weight of acrylic acid, and 1 part by weight of itaconic acid was mixed with 10 parts by weight titanium dioxide, 100 parts by weight of calcium magnesium carbonate filler, a dispersing agent and a de-foamer. The filler was a mixture of Microdol H-400 and Microdol Extra, the dispersing agent was 0.2 parts by weight of 20% Calgon PT per 100 parts by weight of dry copolymer, and the de-foamer was 1.0 part by weight (wet) of Foamaster NXZ per 100 parts by weight of dry copolymer. The mixture was thickened to 1000 mPa.s Brookfield RVT, spindle 6/100 rpm using 0.7 parts by weight of sodium polyacrylate per 100 parts by weight of dry copolymer. The composition was applied to wall paper base paper using standard wallpaper coating equipment i.e. air knife, rotary screen and rotogravure equipment. The coated papers were passed through ovens at temperatures of 120°–150° C. with dwell times of approximately 20 to 30 seconds. In each case the coating was approximately 50 g/m$^2$ and had an even weight profile across the paper web.

After use, the equipment was cleaned using only water, without the need for spirit based solvents which require specialist disposal.

EXAMPLE 10

A 49% aqueous latex of a copolymer containing 70 parts by weight of methylmethyacrylate, 28 parts by weight of butadiene, and 2 parts by weight of iraconic acid was mixed with 10 parts by weight of titanium oxide, 120 parts by weight of calcium carbonate filler (Snowcal 60 of Croxton and Garry Ltd), and a blowing agent, a dispersing agent and a de-foamer. The blowing agent was 10 parts by weight of Mikroperlen F30 per 100 parts by weight of dry copolymer, the dispersing agent was 0.2 parts by weight of 20% Calgon PT per 100 parts by weight of dry copolymer, and the de-foamer was 1.0 part by weight (wet) of Surfynol DF 110L per 100 parts by weight of the dry copolymer. The mixture was thickened to 1400 mPa.S Brookfield RVT, spindle 6/100 rpm using 0.8 parts by weight of sodium polyacrylate per 100 parts by weight of dry copolymer.

The composition was applied to wallpaper base paper using deep etch rotogravure equipment to form a pattern on the paper of an irregular "splash" design. The coated paper was passed through an oven at 150° C. with a dwell time of approximately 15 to 20 seconds to obtain a wallpaper having a white expanded textured pattern finish with excellent print definitions.

After use, the equipment could be readily cleaned with water without the use of spirit based solvents.

EXAMPLE 11

A 51% aqueous latex formed from a copolymer containing 77 parts by weight of methylmethacrylate, 20 parts by weight of butadiene, 2 parts by weight of acrylic acid, and 1 part by weight of iraconic acid was mixed with 15 parts by weight of titanium dioxide, 150 parts by weight of calcium carbonate filler (Polycarb 90 of ECC International), a dispersing agent and a defoamer. The dispersing agent was 0.2 parts by weight (wet) of 20% Calgon PT per 100 parts by weight of dry copolymer and the de-foamer was 0.5 parts by weight (wet) of Hercules 1512M per 100 parts by weight of dry copolymer. The mixture was thickened to 1000 mPa.s Brookfield RVT, spindle 6/100 rpm using 0.4 parts weight (wet) of Acrysol RM 825 per 100 parts of dry copolymer. A 110 g/m$^2$ coating of this composition was applied to 90 g/m$^2$ wallpaper base paper by the knife over roller technique and dried at 150° C. for 60 seconds.

By way of comparison a 110g/m$^2$ coating of PVC plastisol, formulated for wallpaper manufacture, was applied to 90 g/m$^2$ wallpaper base paper. It was pre-gelled for 120 seconds at 120° C. and fully gelled for 12 seconds at 185° C.

An aqueous ink system was then applied to each coated paper using a standard laboratory RK printer. The depth ranged from 2x tone to 0.2x tone. The printed papers were dried at 125° C. for 20 seconds and examined for smoothness, evidence of flocculation, floatation, crawling etc. ("Crawling" is a well known phenomenon and refers to the tendency of a wet polymer film coated on a substrate to recede from certain areas of the substrate). The latex based coating was smoother than the PVC coating and the ink exhibited less flocculation and crawling.

EXAMPLE 12

A 55% aqueous latex formed from a copolymer containing 50 parts by weight of methylmethacrylate, 47 parts by weight of butadiene, 2 parts by weight of acrylic acid and 1 part by weight of iraconic acid was mixed with 10 parts by weight of titanium dioxide, 130 parts by weight of calcium magnesium carbonate filler (Microdol H-400/Microdol Super mixture) and a dispersing agent and a de-foamer. The dispersing agent was 0.2 parts by weight of 20% Calgon PT per 100 parts by weight of dry copolymer and the de-foamer was 1 part by weight of Foamaster DF124L per 100 parts by weight of wet composition. The mixture was thickened to 1000 mPa.s Brookfield RVT, spindle 6/100 rpm using 0.6 parts by weight of sodium polyacrylate per 100 parts by weight of dry copolymer.

A 110 g/m$^2$ coating of this composition was applied to 90 g/m$^2$ wallpaper base paper by the knife over roller technique and dried at 150° C. for 45 seconds. Samples of the coated paper were adhered to various walls (emulsion painted, gloss painted and plaster) using 'Solvite' wallpaper adhesive and allowed to dry for 24 hours.

After drying, the coating could be cleanly stripped from the base paper without removing the base paper from the wall.

EXAMPLE 13

A 50% aqueous latex formed from a copolymer containing 64 parts by weight of methylmethacrylate, 33 parts by weight of butadiene, 2 parts by weight of acrylic acid and 1 part by weight of iraconic acid was mixed with 10 parts by weight of titanium dioxide, 100 parts by weight of calcium magnesium carbonate filler (Microdol Super), a dispersing agent and a de-foamer. The dispersing agent was 0.2 parts by weight of 20% Calgon PT per 100 parts by weight of dry copolymer and the de-foamer was 1 part by weight of Surfynol DF110L per 100 parts by weight of wet composition. The mixture was thickened to 1000 mPa.s Brookfield RVT, spindle 6/100 rpm by the addition of 0.6 parts by weight of sodium polyacrylate per 100 parts of dry copolymer. A 110 g/m$^2$ coating of this composition was applied to 90 g/m$^2$ wallpaper base paper by the knife over roller technique and dried at 150° C. for 60 seconds. The coated paper was calendered using the following conditions:

Centre Roll Temperature 50° C.
Bottom Roll Temperature 50° C.
Pressure 135 lbs per linear inch 5 gram samples of tomato ketchup and mustard were put on the coating and left for an hour before being removed with water. After washing the samples were examined for evidence of staining, and compared to samples of PVC-coated paper which had been subjected to the same conditions.

Very little evidence of staining was seen after washing in either case. The latex coated paper appeared to be slightly more resistant to staining with ketchup than the PVC coated paper.

EXAMPLE 14

A 50% aqueous latex formed from a copolymer containing 64 parts by weight of methylmethacrylate, 33 parts by weight of butadiene, 2 parts by weight of acrylic acid and 1 part by weight of iraconic acid was mixed with 10 parts by weight of titanium dioxide, 100 parts by weight of filler, and a dispersing agent and a de-foamer. The dispersing agent was 0.2 parts by weight of 20% Calgon PT per 100 parts by weight of dry polymer and the de-foamer was 0.8 parts by weight of BYK 033 per 100 parts by weight of the wet composition. The mixture was thickened using 0.9 parts by weight of sodium polyacrylate per 100 parts by weight of dry polymer. Several such mixtures having a viscosity (Brookfield RVT, spindle 6/100 rpm) of from about 3000 to 4000 were made using different fillers. The following fillers were used:

a) Polcarb 90 (Calcium Carbonate)
b) Hydrocarb 95 (Calcium Carbonate)
c) Microdol H-400 (Calcium Magnesium Carbonate)
d) Microdol Extra (Calcium Magnesium Carbonate)
e) Microdol Super (Calcium Magnesium Carbonate)

After thickening, each sample was applied at a level of 110 g/m$^2$ on to 90 g/m$^2$ wallpaper base paper using the knife over roller technique and dried at 150° C. for 60 seconds. The coated papers were examined for gloss, smoothness and calenderability.

Results a) Gloss high at 57%, satisfactory calendering to produce a suitable print surface.
b) Gloss 23–26%, satisfactory calendering to produce a suitable print surface.
c) Gloss good 8–9%, very poor calendering, printing of inferior quality produced.
d) Gloss 26–30%, satisfactory calendering to produce a suitable print surface.
e) Gloss 22–26%, satisfactory calendering to produce a suitable print surface.

The fillers were of different particle size distribution which affects calendering, gloss and smoothness.

EXAMPLE 15

A series of expansible waterbased coating compositions for wallpaper were made using standard laboratory mixing equipment. In each case the composition was made by admixing a 52% aqueous latex formed from a copolymer containing 67 parts by weight of methylmethacrylate, 30 parts by weight of butadiene, 2 parts by weight of acrylic acid, and 1 part by weight of iraconic acid with pigment, filler, 10 parts by weight of blowing agent (Mikroperlen F20) per 100 parts of dry copolymer and additives to aid dispersion and prevent foaming. The dispersion aid was 0.2 parts by weight of 20% Calgon PT per 100 parts by weight of dry copolymer and the anti-foaming additive was 1.0 part by weight of Foamaster DF 124L per 100 parts by weight of wet composition. Different pigment/filler levels were used in each case and they were as follows (in parts by weight):

a) 5 Titanium dioxide 0 Calcium magnesium carbonate
b) 5 Titanium dioxide 10 Calcium magnesium carbonate
c) 5 Titanium dioxide 50 Calcium magnesium carbonate
d) 5 Titanium dioxide 100 Calcium magnesium carbonate
e) 5 Titanium dioxide 200 Calcium magnesium carbonate In each case, the filler was Microdol H-400. Each mixture was thickened to 10500 mPa.s, Brookfield RVT, spindle 7/100 rpm by the addition of 1.1 parts by weight of Acrysol RM 825 per 100 parts by weight of wet compositions. The compositions were applied to 90 g/m$^2$ wallpaper base paper by the knife over roller technique at the same volume and were dried/expanded at 160° C. for 75 seconds. Samples of the coated paper were examined for level of expansion and texture.

| | Results | | | | |
|---|---|---|---|---|---|
| | A | B | C | D | E | |
| Weight laydown obtained: | 145 | 155 | 186 | 243 | 343 | g/m$^2$ |
| Film thickness obtained: | 1.28–1.4 | 1.2–1.4 | 1.4–1.5 | 1.38–1.41 | 1.4–1.5 | mm |

All the coated papers exhibited a textured surface and all were expanded to some degree. However, 50–100 parts of filler produced the best expansion and texture for optimum results.

EXAMPLE 16

A 51% aqueous latex formed from a butadiene/ethyl methacrylate copolymer containing 23 parts by weight butadiene, 64 parts by weight of ethyl methacrylate, 2 parts by weight of acrylic acid and 1 part by weight of iraconic acid, was admixed with 1 part (wet) by weight of Foamaster DF124L, with 150 parts by weight of Microdol Extra, with 15 parts by weight of titanium dioxide pigment and with 0.2 parts by weight (dry) of 20% Calgon PT solution, per 100 parts by weight of the dry copolymer. The mixture was thickened to 900 mPa.s, Brookfield RVT, spindle 6/100 rpm, by the addition of 0.4 parts by weight (dry) of sodium polyacrylate thickener per 100 parts by weight of dry copolymer.

A 90 g/m$^2$ dry coating of this composition was applied to 90 g/m$^2$ wallpaper base paper using a Werner Mathis Knife over roller. The coating was dried at 130° C. for 45 seconds. Thereafter, the free surface of the dried coating was found to be white and smooth. It had a low gloss and was suitable for printing with aqueous inks.

Samples of the coated paper were adhered to an emulsion painted wall using 'Solvite' wallpaper adhesive and allowed to dry for 24 hours.

After drying the coating could be cleanly stripped from the base paper without removing the base paper from the wall.

We claim:

1. A wall covering comprising a wallpaper base paper coated directly with a composition comprising a copolymer of a conjugated diene and a copolymerisable unsaturated ester in admixture with a filler and/or a pigment.

2. A wall covering as claimed in claim 1 wherein the coated composition has a free surface which carries a printed design.

3. A wall cover as claimed in claim 1 wherein the conjugated diene is butadiene and the copolymerisable unsaturated ester is methyl methacrylate, ethyl methacrylate, butyl methacrylate, methyl acrylate, ethyl acrylate, propyl acrylate, butyl acrylate or hexyl acrylate.

4. A wall covering as claimed in claim 1 wherein the copolymer additionally includes units derived from (meth-)acrylic acid, itaconic acid, hydroxyethyl acrylate, acrylamide, divinyl benzene, or ethylene glycol dimethacrylate.

5. A wall covering as claimed in claim 1 wherein the filler is calcium carbonate, calcium magnesium carbonate, or clay.

6. A wall covering as claimed in claim 1 wherein the pigment is titanium dioxide.

7. A wall covering as claimed in claim 1 and additionally including a blowing agent.

8. A wall covering as claimed in claim 1 wherein the copolymer includes from 10 to 70 parts by weight of butadiene and from 90 to 30 parts by weight of the copolymerisable unsaturated ester and the composition comprises from 5 to 350 parts by weight of the filler per 100 parts by weight of dry copolymer and from 1 to 30 parts by weight of the pigment per 100 parts of dry copolymer.

9. A wall covering comprising a wallpaper base paper coated directly with a composition which is free of filler and pigment and which comprises a copolymer of a conjugated diene and a copolymerisable unsaturated ester.

* * * * *

UNITED STATES PATENT AND TRADEMARK OFFICE
CERTIFICATE OF CORRECTION

PATENT NO. : 5,543,207
DATED : August 6, 1996
INVENTOR(S) : Heighington et al.

It is certified that error appears in the above-identified patent and that said Letters Patent are hereby corrected as shown below:

Abstract line 3, change "methacrylate" to --methylmethacrylate--
Column 14, Line 32    "-" should be deleted and --)-- should be inserted at end of line
Column 14, Line 33    ")" should be deleted
On the title page, item [30] insert --GB 9302415.6 Feb. 8, 1993--. under Foreign Application Priority Data Signed and Sealed this Fifth Day of November, 1996

Attest:

BRUCE LEHMAN

*Attesting Officer*    Commissioner of Patents and Trademarks